(12) United States Patent
Landry et al.

(10) Patent No.: US 11,047,567 B2
(45) Date of Patent: Jun. 29, 2021

(54) STEAM GENERATOR

(71) Applicant: TECHNOLOGIES STEAMOVAP INC., Montréal (CA)

(72) Inventors: Éric Landry, Montréal (CA); Jean François Boyer, Montréal (CA); Bernard Saint-Yves, Montréal (CA)

( * ) Notice: Subject to any disclaimer, the term of this patent is extended or adjusted under 35 U.S.C. 154(b) by 304 days.

(21) Appl. No.: 16/106,479

(22) Filed: Aug. 21, 2018

(65) Prior Publication Data
US 2019/0063741 A1 Feb. 28, 2019

Related U.S. Application Data

(60) Provisional application No. 62/548,446, filed on Aug. 22, 2017.

(51) Int. Cl.
| | |
|---|---|
| *F22B 37/78* | (2006.01) |
| *F22B 1/28* | (2006.01) |
| *F24F 6/18* | (2006.01) |
| *F24F 6/00* | (2006.01) |
| *F24F 11/89* | (2018.01) |
| *F22B 35/10* | (2006.01) |
| *F22B 37/38* | (2006.01) |

(Continued)

(52) U.S. Cl.
CPC .............. *F22B 37/78* (2013.01); *F22B 1/284* (2013.01); *F22B 35/10* (2013.01); *F22B 37/38* (2013.01); *F22B 37/50* (2013.01); *F24F 6/18* (2013.01); *F24F 11/89* (2018.01); *G01F 23/296* (2013.01); *F24F 2006/008* (2013.01)

(58) Field of Classification Search
None
See application file for complete search history.

(56) References Cited

U.S. PATENT DOCUMENTS

| | | | | |
|---|---|---|---|---|
| 2,750,064 A | * | 6/1956 | Clarke | A47J 47/14 |
| | | | | 220/4.24 |
| 3,584,193 A | * | 6/1971 | Badertscher | F24F 6/12 |
| | | | | 392/328 |

(Continued)

FOREIGN PATENT DOCUMENTS

EP 0 769 662 A1 4/1997

*Primary Examiner* — Thor S Campbell
(74) *Attorney, Agent, or Firm* — Lavery, De Billy, LLP; Gwendoline Bruneau

(57) ABSTRACT

A steam generator and a method for generating steam, the generator comprising a steam chamber fed with water from a water from a water reservoir for heating by a heating source to generate steam, steam being delivered out through a steam outlet, and waste water being evacuated through a drain, the steam generator comprising a control chamber, in fluid communication with the steam chamber so as that a water level in the control chamber is indicative of a water level in said steam chamber; at least one water level-sensor configured for detecting the water level in the control chamber; and a control unit receiving a signal from the water level-sensor. There is further provided a method of generating steam in a steam chamber receiving Water is fed from the water reservoir simultaneously to the steam chamber and to the control chamber, through a single feeding valve, the feed water being mixed with hot waste water drained from the steam chamber, upstream of a drain pump.

13 Claims, 13 Drawing Sheets

(51) Int. Cl.
*F22B 37/50* (2006.01)
*G01F 23/296* (2006.01)

(56) References Cited

U.S. PATENT DOCUMENTS

| | | | | |
|---|---|---|---|---|
| 4,092,519 A * | 5/1978 | Eaton-Williams | ........ | F22B 1/30 |
| | | | | 220/320 |
| 4,423,310 A * | 12/1983 | Zerbel | ........ | F22B 1/30 |
| | | | | 338/83 |
| 4,513,887 A * | 4/1985 | Wicke | ........ | F16B 7/0413 |
| | | | | 222/146.5 |
| 4,668,854 A * | 5/1987 | Swan | ........ | F22B 1/287 |
| | | | | 392/399 |
| 4,940,473 A * | 7/1990 | Benham | ........ | B01D 19/0057 |
| | | | | 210/167.01 |
| 5,305,415 A * | 4/1994 | Stevens | ........ | F22B 1/284 |
| | | | | 219/437 |
| 5,355,840 A * | 10/1994 | Violi | ........ | F22B 1/284 |
| | | | | 122/446 |
| 5,411,162 A * | 5/1995 | Koziczkowski | ........ | C23C 4/00 |
| | | | | 220/320 |
| 5,467,424 A * | 11/1995 | Davies | ........ | F22B 1/284 |
| | | | | 122/36 |
| 5,815,637 A | 9/1998 | Allen et al. | | |
| 5,833,812 A * | 11/1998 | Hartman | ........ | B01D 1/0017 |
| | | | | 203/1 |
| 6,008,482 A * | 12/1999 | Takahashi | ........ | B24B 49/105 |
| | | | | 219/687 |
| 6,078,729 A * | 6/2000 | Kopel | ........ | F22B 1/284 |
| | | | | 392/324 |
| 6,115,539 A * | 9/2000 | Cohn | ........ | F24F 6/025 |
| | | | | 392/402 |
| 6,169,852 B1 * | 1/2001 | Liao | ........ | F22B 1/284 |
| | | | | 261/142 |
| 6,198,879 B1 * | 3/2001 | Harris | ........ | F24H 7/0433 |
| | | | | 392/451 |
| 7,623,771 B2 * | 11/2009 | Lentz | ........ | F22B 37/56 |
| | | | | 392/386 |
| 7,766,310 B2 | 8/2010 | Wolff et al. | | |
| 7,912,360 B2 * | 3/2011 | Gschwind | ........ | F01N 3/2066 |
| | | | | 392/456 |
| 7,942,390 B2 * | 5/2011 | Menassa | ........ | F22B 1/284 |
| | | | | 261/131 |
| 9,702,544 B2 * | 7/2017 | Amoretti | ........ | F22B 1/284 |
| 2007/0147808 A1 * | 6/2007 | Egeresi | ........ | A61H 33/063 |
| | | | | 392/485 |
| 2010/0154534 A1 * | 6/2010 | Hampton | ........ | G01F 23/265 |
| | | | | 73/304 C |
| 2011/0095010 A1 * | 4/2011 | Bondarowicz | ........ | F24H 1/202 |
| | | | | 219/209 |
| 2013/0084225 A1 * | 4/2013 | Buczynski | ........ | A61L 2/07 |
| | | | | 422/292 |
| 2014/0203459 A1 | 7/2014 | Kopel et al. | | |
| 2015/0115053 A1 | 4/2015 | Kopel et al. | | |
| 2017/0208985 A1 * | 7/2017 | Frock | ........ | A47L 15/14 |
| 2018/0038584 A1 * | 2/2018 | Zhang | ........ | F22B 1/28 |

* cited by examiner

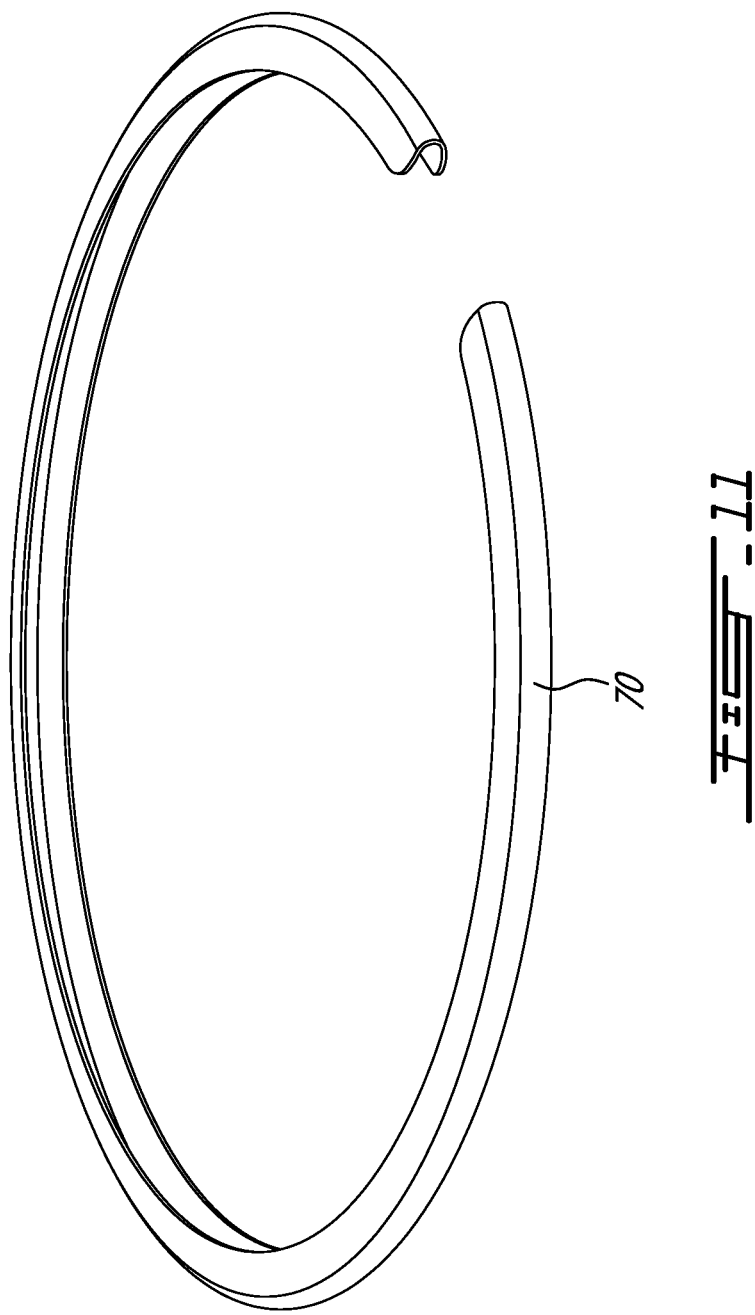

STEAM GENERATOR

CROSS REFERENCE TO RELATED APPLICATIONS

This application claims benefit of U.S. provisional application Ser. No. 62/548,446, filed on Aug. 22, 2017. All documents above are incorporated herein in their entirety by reference.

FIELD OF THE INVENTION

The present invention relates to steam generation. More specifically, the present invention is concerned with a system and a method for generating steam.

BACKGROUND OF THE INVENTION

In cities, generators for humidification are usually fed with city tap water or soft water. Water boiling typically generates scale deposits, which are removed manually during scheduled service consisting in opening the steam chamber of the steam generators and manually removing any accumulated scale. As such manual maintenance can be time consuming and delicate, it tends to be neglected, resulting in premature failure of the steam generators.

Typically, the control water level in steam generators uses sensors that are in direct contact with the water, such as a conductive or capacitive sensors or probes sensor and floats. In the case of city water, the sensors are thus in contact with minerals contained in water. If not regularly checked and cleaned regularly and/or replaced the sensors may fail after a period of normal operation, leading to malfunction or even failure of the steam generators.

There is thus a need in the art for a system and a method for generating steam.

SUMMARY OF THE DISCLOSURE

More specifically, in accordance with the present disclosure, there is provided a steam generator comprising a steam chamber fed with water from a water from a water reservoir for heating by a heating source to generate steam, steam being delivered out through a steam outlet, and waste water being evacuated through a drain, the steam generator comprising a control chamber, in fluid communication with the steam chamber so as that a water level in the control chamber is indicative of a water level in the steam chamber; at least one water level-sensor configured for detecting the water level in the control chamber; and a control unit receiving a signal from the water level-sensor.

There is further provided a method of generating steam in a steam chamber receiving water from a water reservoir for heating by a heating source, comprising feeding water from a water reservoir simultaneously to a steam chamber and to a control chamber, through a single feeding valve, the feed water being mixed with hot waste water drained from the steam chamber, upstream of a drain pump.

Other objects, advantages and features of the present disclosure will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 11 is a perspective view of a clamp ring according to an embodiment of an aspect of the present disclosure.

DESCRIPTION OF ILLUSTRATIVE EMBODIMENTS

The present invention is illustrated in further details by the following non-limiting examples.

Figure 1:
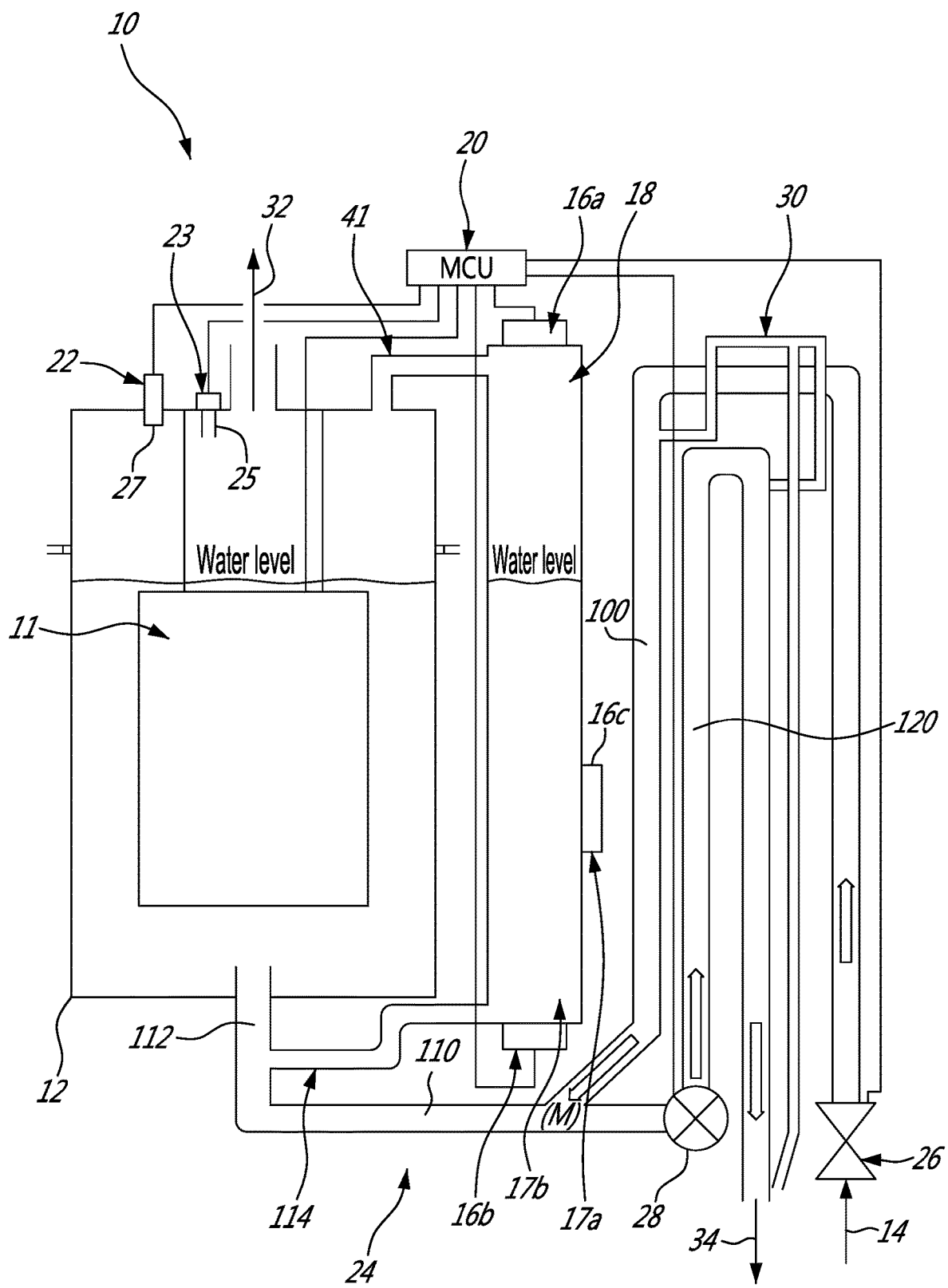
FIG. 1 is a schematical view of a system according to an embodiment of an aspect of the present disclosure.

A steam generator 10 as schematically illustrated in FIG. 1 comprises a water reservoir 14, a steam chamber 12, a heating source 11, a steam outlet 32 and a drain 34. Water is directed from the water reservoir 14 to the steam chamber 12 where it is heated by the heating source 11 to generate steam, which is delivered out through the steam outlet 32, and waste water is evacuated through the drain 34, as will be further described hereinbelow.

The heating source 11 may comprise electric heating sources, electrodes, a heat exchanger using steam or a burner using combustible for example.

The steam generator 10 further comprises a control chamber 18. The steam chamber 12 and the control chamber 18 are in fluid communication, through lower and upper ducts 114 and 41 as shown in FIG. 1 to balance pressure in the steam chamber 12 and in the control chamber 18, so that the water level within the control chamber 18 is representative of the water level within the steam chamber 12. In the embodiment illustrated in FIG. 1, the control chamber 18 is a tube 18, shown generally deported and parallel to the steam chamber 12, and vertical, although it may be inclined relative to the vertical position, up to about 45 degrees for example. Such a tubular control chamber 18 is found to be effective and space efficient.

A proportional water level sensor is used to continuously detect the water level within the control chamber 18. It may be a non-contact level sensor, such as ultrasonic sensor or a Hall Effect sensors 16a, 16b for example. In the case of an ultrasonic sensor, a water temperature sensor 17a, 17b is used for calibration thereof. Moreover, the position of the sensor is selected to avoid surfaces of deposit of particles within the chamber, which may affect the response of the ultrasonic sensor.

Water level measurement may thus be done using an ultrasonic sensor 16*b* located at the bottom of the control tube 18 and an ultrasonic sensor 16*a* located on top of the control tube 18 as illustrated for example in FIG. 1.

In case of a single ultrasonic sensor, the ultrasonic sensor may be located either at the top or at the bottom of the tube 18, although positioning the ultrasonic sensor at the bottom of the control chamber, as opposed to positioning it at the top of the control chamber, avoids sensing through a layer of gas over the top liquid level, as well as avoiding the heat of the steam.

Sensors installation directly on the walls of the steam chamber 12 may be contemplated, instead of on the walls of a separate control chamber 18 as described hereinabove, providing the sensors are configured for operation within the corresponding environment, including for example temperatures and condensation.

Hall Effect sensors may also be used.

As an example of direct contact level sensor, a proportional float sensor using hall effect or resistive for example may be used.

As liquid level detecting may be affected by the presence of foam, foam sensors, such as capacitive and/or conductive sensors 22, 23, are positioned on top of the steam chamber 12. Conductive rods 25 of the conductive sensor 23 extending from the top cover of the steam chamber 12 within the steam chamber 12; under application of current, since foam is conductive, foam reaching the rods 25 results in a current conduction between the rods 25. In case of a capacitive sensor 22, foam reaching the rod 27 extending from the top cover of the steam chamber 12 within the steam chamber 12 triggers current conduction between the single rod 27 and the ground. Two conductive sensors may be used, the foam being detected when an electrical contact is established between a first, positive, sensor and a second, grounded, sensor.

A control unit 20 collects signals from the water level and foam sensors. When using ultrasonic sensors, the control unit 20 also collects signals from the water temperature sensor for calibration of the ultrasonic sensors as mentioned hereinabove for example.

The steam chamber 12 and the control chamber 18 are connected to a water feed-and-drain hydraulic circuit 24.

The water feed-and-drain hydraulic circuit 24 comprises a fill valve 26 for fluid communication with the water reservoir 14, a drain pump 28 to the drain 34, and an open-air gap 30 connected to the water supply duct and to the drain duct.

The drain pump may be replaced by an electric drain valve, i.e. an electric actuator using an electric motor to provide torque to operate a gate or ball valve installed on the drain duct.

Water is directed from the water reservoir 14 through the fill valve 26 to the steam chamber 12 through ducts 100, 110, 112, where it is heated by the heating source 11 to generate steam, which is delivered through the steam outlet 32. Waste water is evacuated through ducts 112, 110 via the drain pump 28 and through drain duct 120, connected to an open-air gap 30, to the drain 34.

The diameter and flow rates of feed/drain ducts 100, 110 and ducts 114 and 112 to the control chamber 18 and to the steam chamber 12 respectively, are selected so that the control chamber 18 fills at substantially at the same rate than the steam chamber 12, and at most at the same rate than the steam chamber 12 so that the steam chamber 12 fills first or they fill simultaneously.

The hydraulic circuit 24 selectively provides feed water and waste water draining when needed, as will be described hereinbelow. Instead of non-return check valves as vacuum breakers allowing air to come into the system, in one direction, in case of back flow from the main water supply duct, and blocking water from escaping on the other direction, which are commonly used in boiler water hydraulic circuits, the open-air gap 30 connected to the water supply duct 100 prevents backflow. The open-air gap 30 is redirected to the drain 34, for connection to the water loop to prevent siphon effect.

A single water inlet fill valve 26, such as a solenoid fill valve for example, controls water feeding from the water reservoir 14 to the steam chamber 12 through ducts 100, 110, 112 and to the control chamber 18 through ducts 100, 110, 114. Water is fed from the reservoir 14, from the bottom of the steam chamber 12, through the valve 26, and mixed with hot waste water drained from the steam chamber 12 at the bottom of the generator 10, upstream of the drain pump 28 (see position (M) in FIG. 1).

Thus, the valve 26 also controls wasted water cooling off during draining, as hot waste water drained from the steam chamber 12 at the bottom of the generator 10 is thus cooled down, to a maximum temperature of about 60° C. from a typical temperature when exiting the steam chamber 12 of about of 90° C. for example, upstream of the drain pump, before it is evacuated through drain duct 120 and drain 34.

Thus, according to an embodiment of an aspect of the present disclosure, upon filing the steam chamber 12, with the control chamber 18 filling at the same rate, the proportional water level sensor detects the water level within the control chamber 18 and sends corresponding signals to the control unit 20. The control unit 20 controls closing of the water fill valve 26 when a predetermined water level is detected within the steam chamber 12 as measured within the control chamber 18.

During normal operation, as heating of the water within the steam chamber 12 by the heating source 11 causes evaporation of the water, the water level slowly decreases within the steam chamber 12. The proportional water level sensor sends signals to the control unit 20 that are proportional to the water level within the control chamber 18 corresponding to the water level within the steam chamber 12, thereby activating the control unit 20 into opening the valve 26 to compensate for the water evaporated from the chamber 12 and thus maintain the water level inside the steam chamber 12 within a predetermined operational range.

When city water is used for example, minerals naturally contained in the water concentrate as the water inside the steam chamber 12 evaporates, thereby generating foam. Foam activates the foam sensors located on top of the steam chamber 12 as described hereinabove, and they send a signal to the control unit 20. The control unit 20 then orders a de-concentration cycle, which consists of a partial drain of the water contained in the steam chamber 12 and water filling with new feed water for example.

Using data collected by the bottom sensor 16*b*, the wave propagation speed may be determined based on a known diameter of the control chamber 18 and a known water temperature as measured by a temperature sensor 17*a* or 17*b*. This determined wave propagation speed may be compared with data collected by an ultrasonic sensor 16*c* positioned on a side wall of the control chamber 18 as shown in FIG. 1 to determine the concentration of minerals in the water. Thus, water temperature data and total dissolved solid measurement (TDS) data may be collected and processed to predict apparition of foam and thereby adapt the de-concentration cycle by triggering draining small amount of water and re-filling with the same small amount of fresh water from the water reservoir, at a predetermined threshold of dissolved solid content data, based upon water quality, before apparition of foam, thereby avoiding complete de-concentration cycle, i.e. steam production interruption as well as associated water and energy consumption.

The control unit 20 records the number of hours of operation of the steam generator and the evaporation rate before the occurrence of foam and the de-concentration cycle. The control unit 20 thus monitors planification of calls for service for cleaning the steam chamber 12 based on the evaporation rate and the number of de-concentration cycles.

When service for cleaning is due, disconnection of the system and opening of the water reservoir 14 must be done. According to an embodiment of another aspect of the present disclosure, the steam chamber 12 comprises a bottom part and an top part, the lower part of the steam chamber 12 being rotatable relative to the upper part thereof, using a guide-and-lock, thereby disengaging the steam chamber 12 from the heat source 11, the hydraulic circuit 24 and a housing or enclosure (A) without the need of tools, as will be described hereinbelow.

Figure 2:
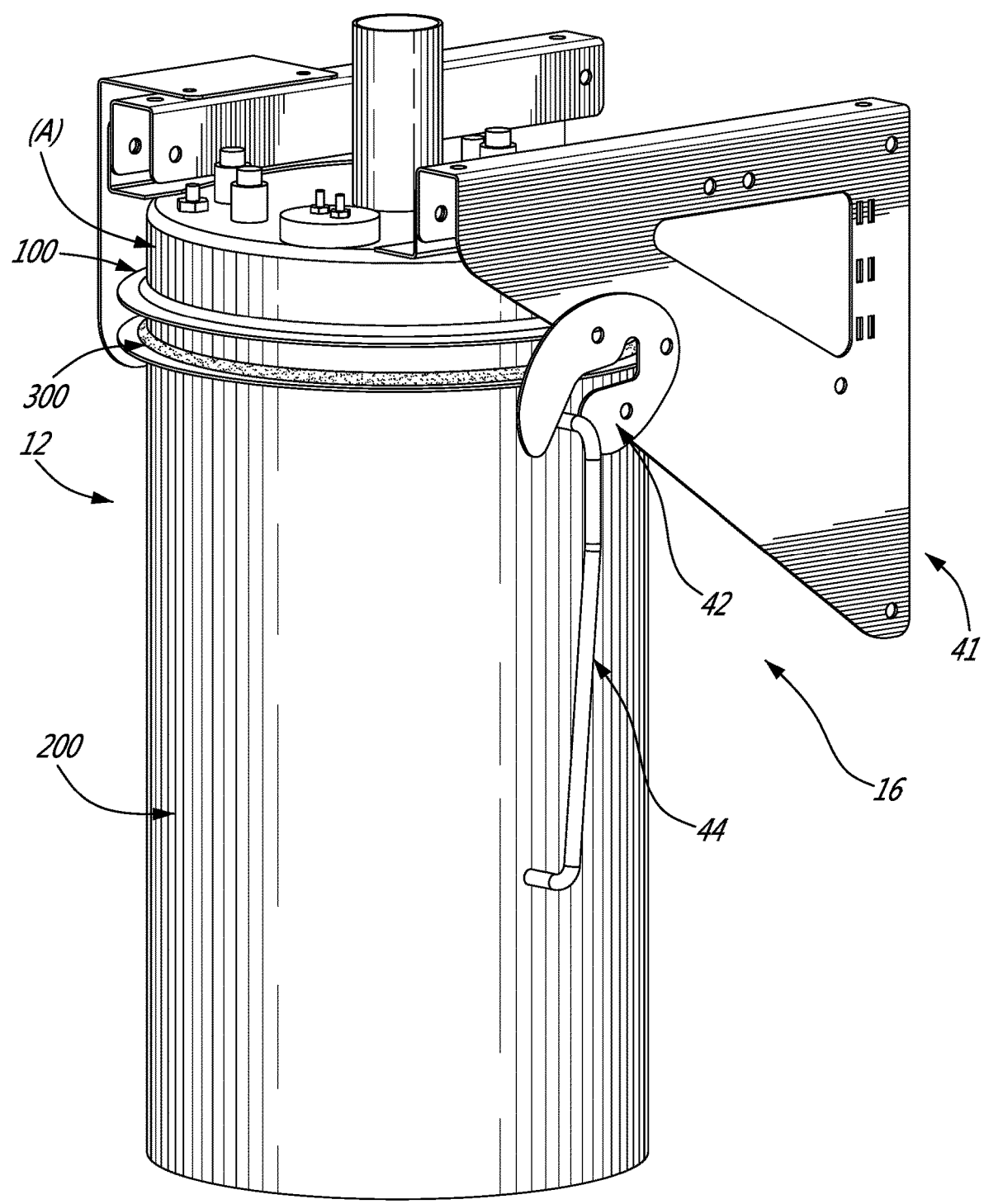
FIG. 2 is a perspective view of a steam chamber according to an embodiment of an aspect of the present disclosure.

Turning to FIG. 2, a steam chamber 12 is shown comprising a top part 100 and a bottom part 200. Typically, the top part 100 is fixed to a housing (A) while the bottom part 200 is removable, and a gasket 300 is used for a tight seal therebetween.

Figure 3:
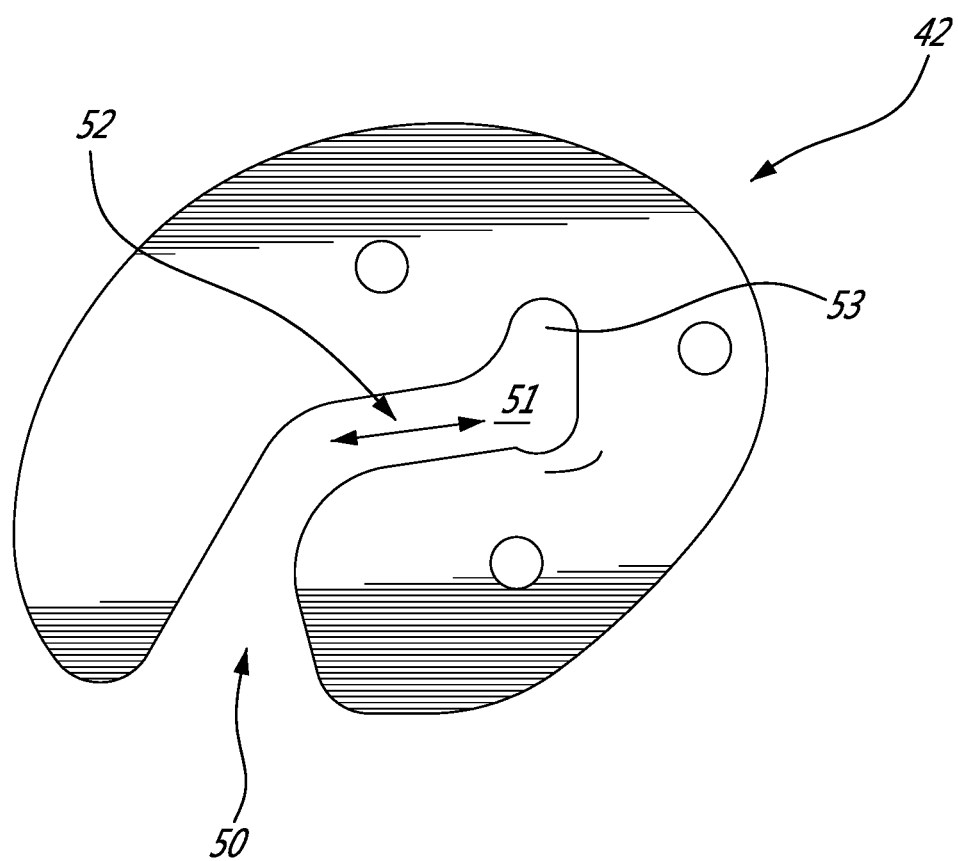
FIG. 3 of a detail of a guide-and-lock system of a steam chamber according to an embodiment of an aspect of the present disclosure.
Figure 4A:
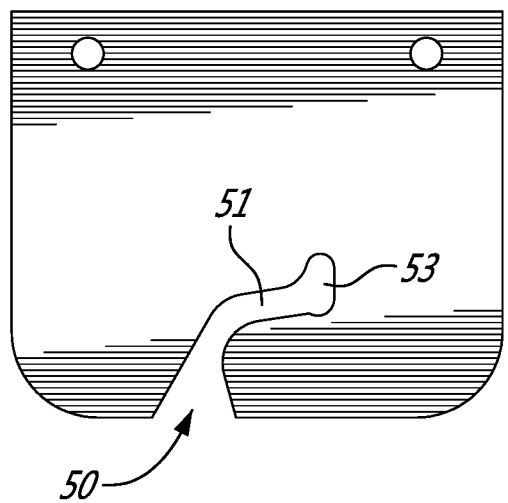
FIG. 4A shows a guide of a guide-and-lock system of a steam chamber according to an embodiment of an aspect of the present disclosure.
Figure 4B:
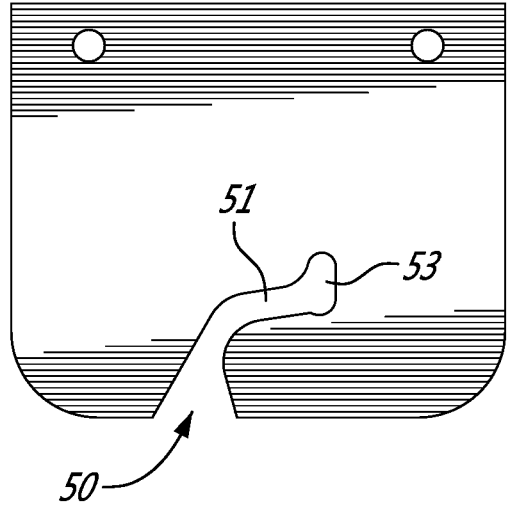
FIG. 4B shows a guide of a guide-and-lock system of a steam chamber according to an embodiment of an aspect of the present disclosure.
Figure 4C:
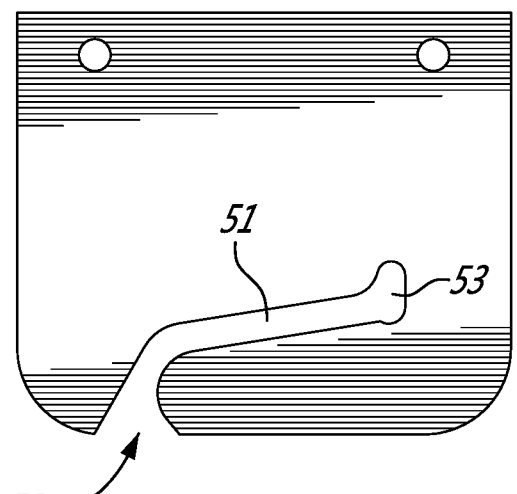
FIG. 4C shows a guide of a guide-and-lock system of a steam chamber according to an embodiment of an aspect of the present disclosure.
Figure 4D:
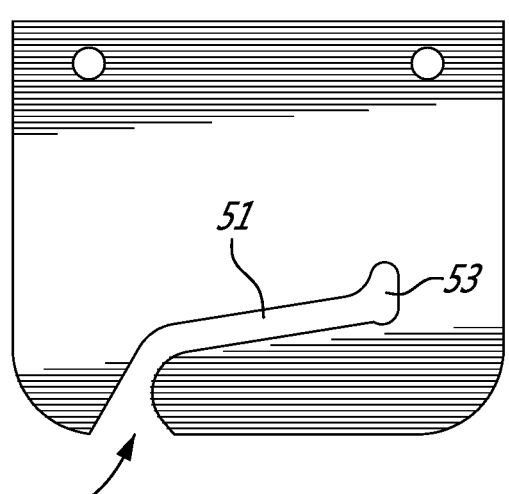
FIG. 4D shows a guide of a guide-and-lock system of a steam chamber according to an embodiment of an aspect of the present disclosure.

The bottom part 200 of the steam chamber 12 may be removably connected to the top part 100 of the steam chamber 12 by a guide-and-lock system 16 best seen in FIGS. 2-4, optionally using a ring clamp (FIGS. 8-11).

As shown in FIG. 2, the guide-and-lock system 16 comprises a frame 41 and a guide 42 (FIGS. 3-4), connected to the top 100 of the steam chamber 12, and a handle 44 connected to the bottom part 200 of the steam chamber 12.

In FIGS. 3-4, the guide 42 is shown as a plate comprising a wide opening entrance 50 leading to a slanted slot 51 ending up to a locking end 53. The wide opening entrance 50 allows the guide 42 to easily catch hold of the handle 44 (see FIG. 2), which is then guided along the slanted slot 51 up a slope 52 to tighten while turning the bottom part 200 of the steam chamber 12, the locking end 53 then locking the handle 44 into a final position. The slope 52 covers a portion of a rotation arc and plays the role of a cam while turning the bottom part 200 of the steam chamber 12, i.e. guiding the handle 44 through the arc direction. As illustrated in embodiments shown in FIGS. 3-4, the size, slope angle arc length and width of the slope 52 may vary, as well as the position, depth and width of the slot 51.

Figure 5B:
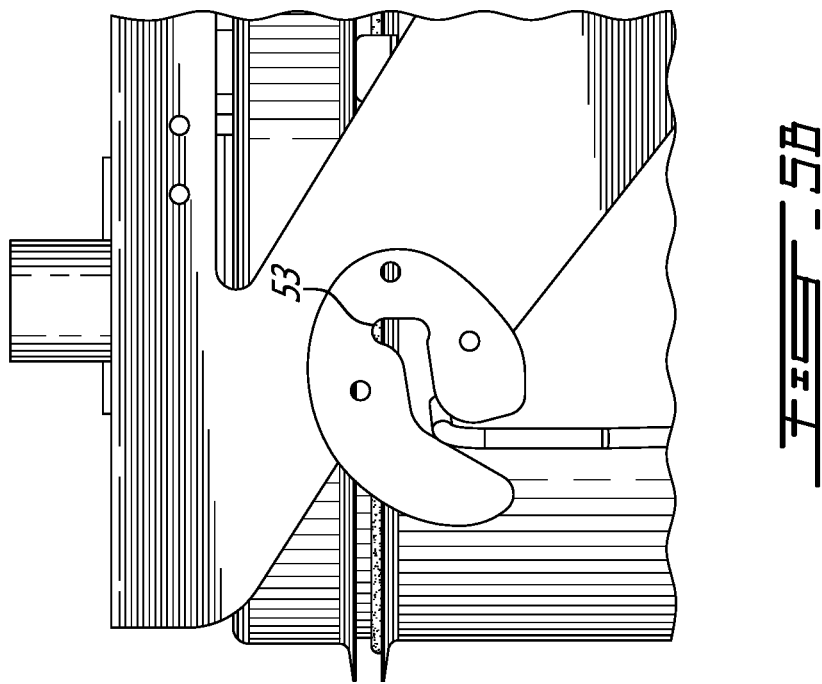
FIG. 5A, FIG. 5B, FIG. 5C, FIG. 5D, FIG. 5E, FIG. 5F, FIG. 5G, FIG. 5H show steps for closing the steam chamber according to an embodiment of an aspect of the present disclosure
Figure 5A:
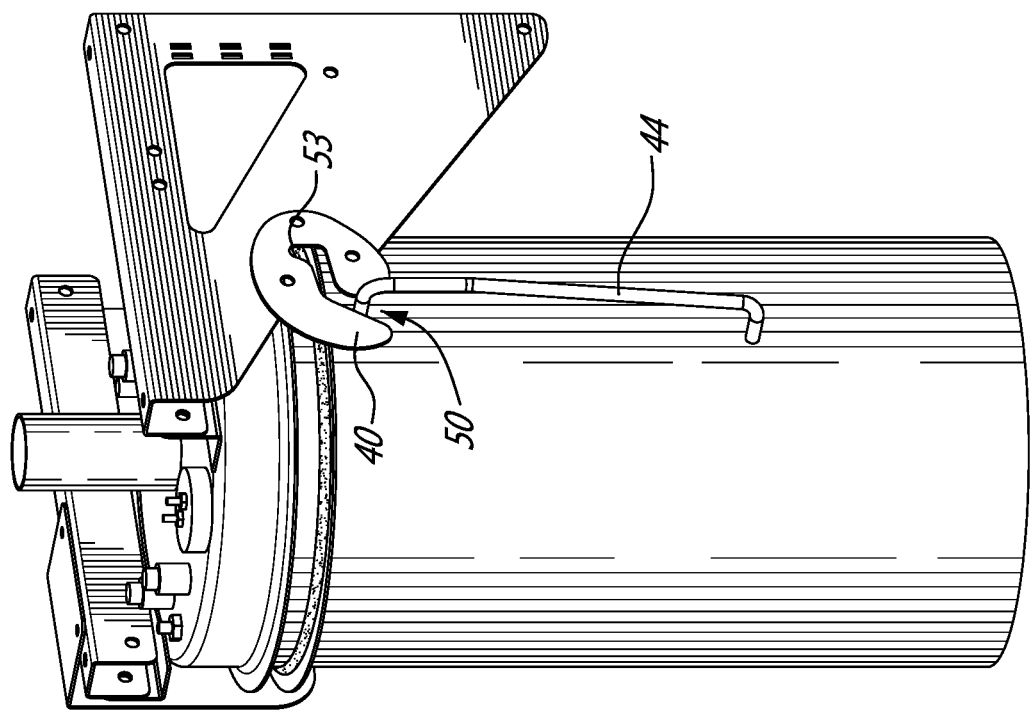
Figure 5C:
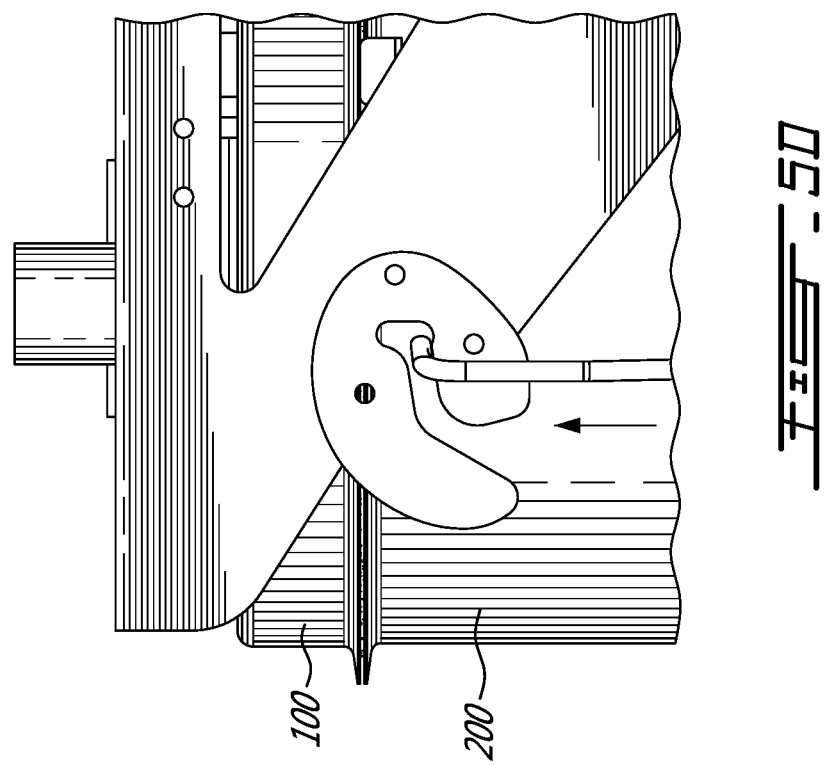
Figure 5D:
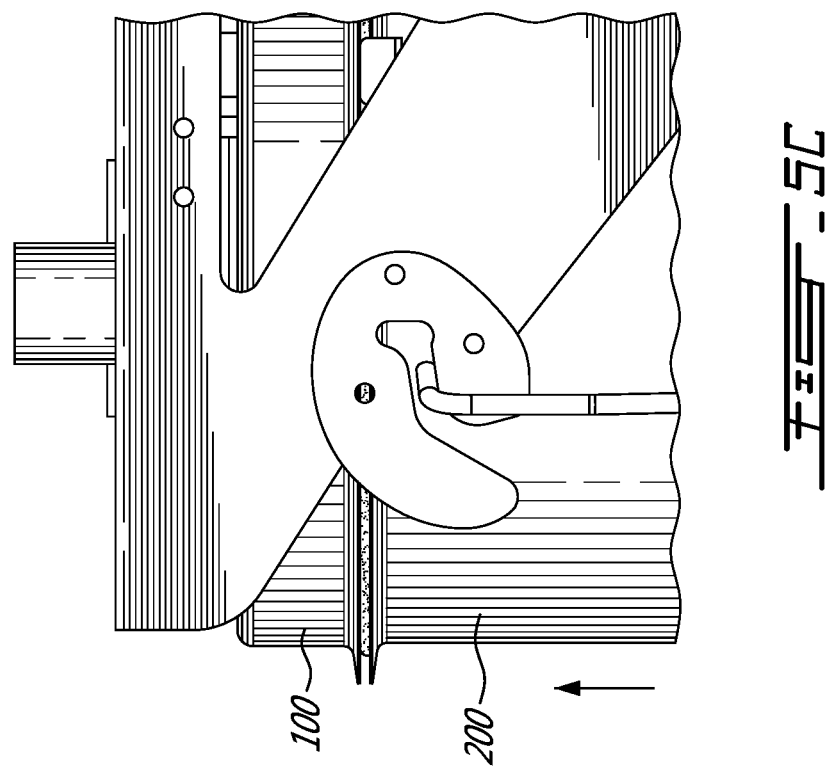
Figure 5F:
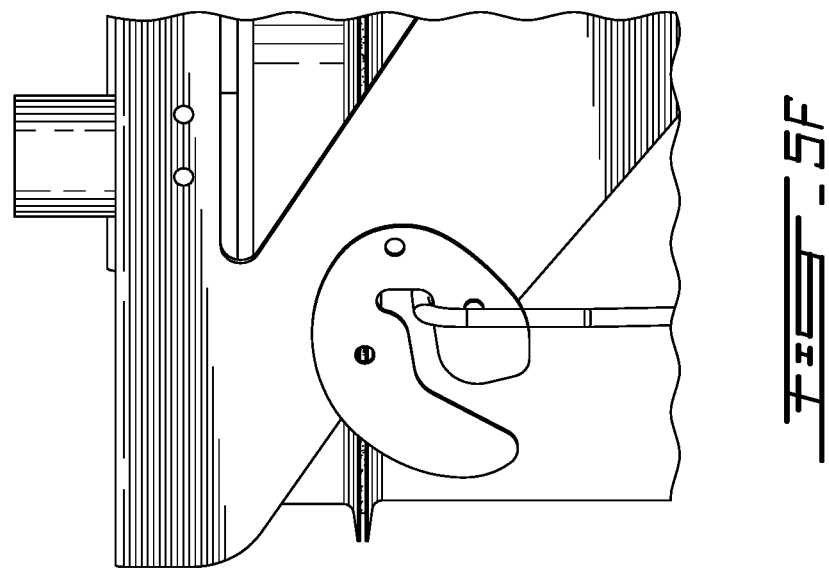
Figure 5E:
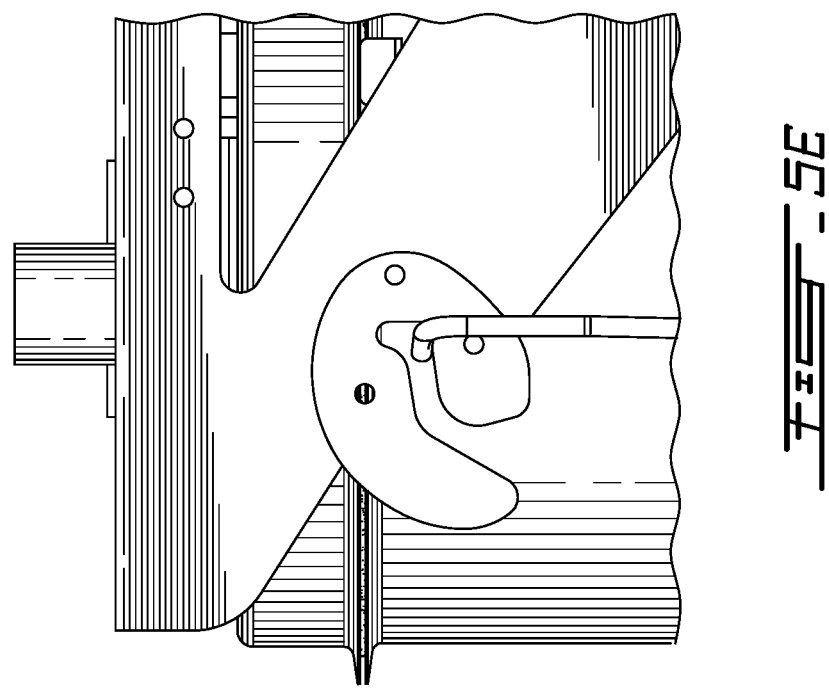
Figure 5G:
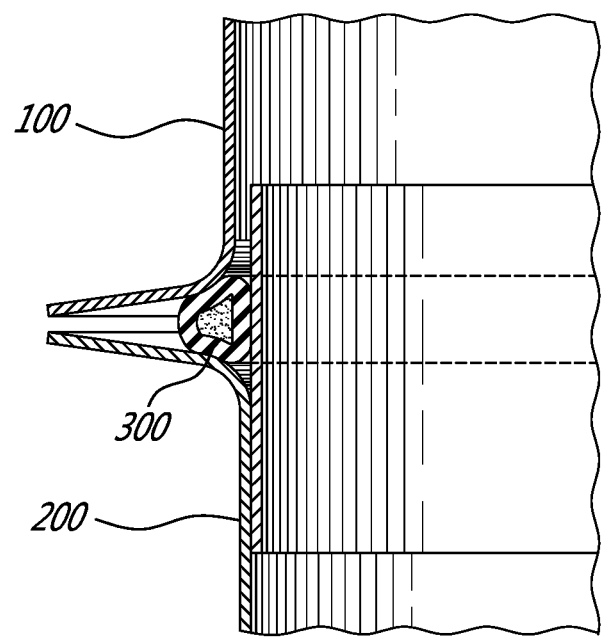
Figure 5H:
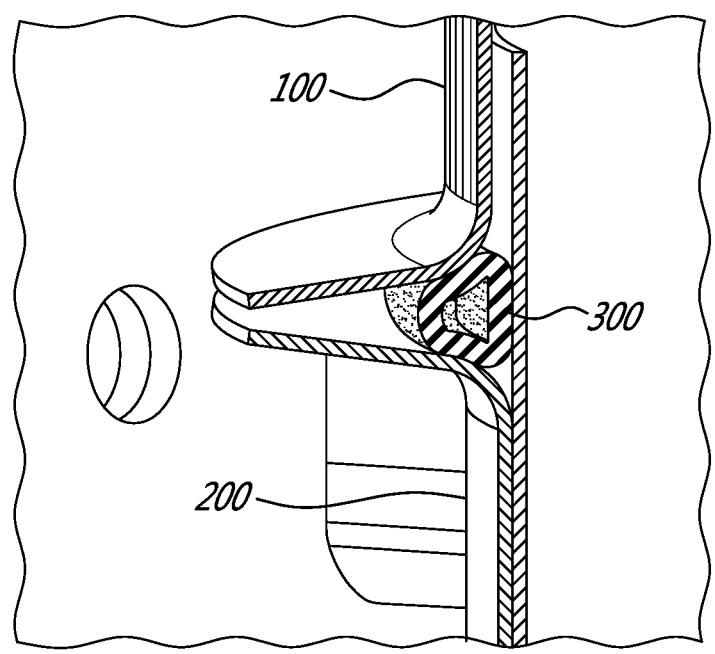
Figure 6:
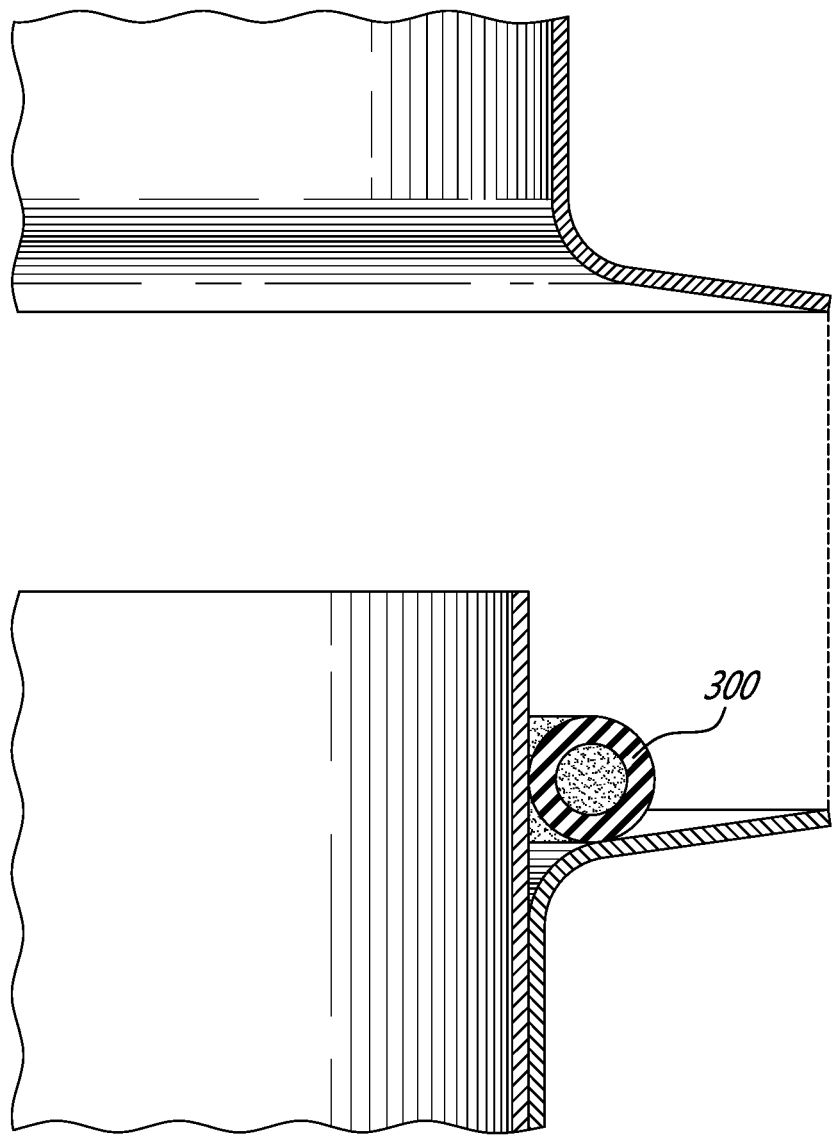
FIG. 6, FIG. 7A, FIG. 7B and FIG. 8A, FIG. 8B show details of the steam chamber in a closed position thereof.
Figure 7A:
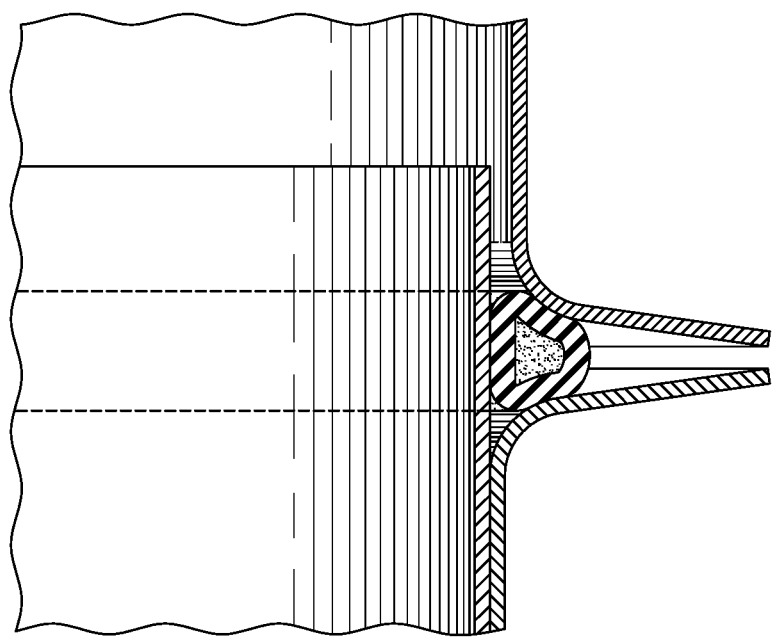
Figure 7B:
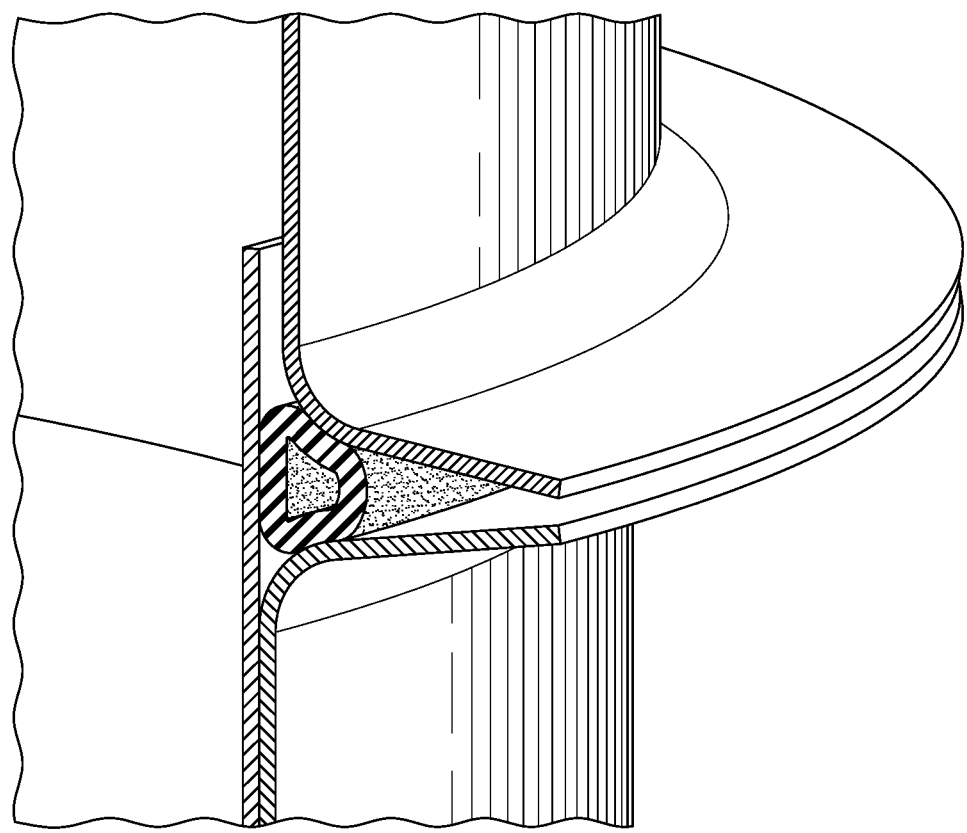
Figure 8A:
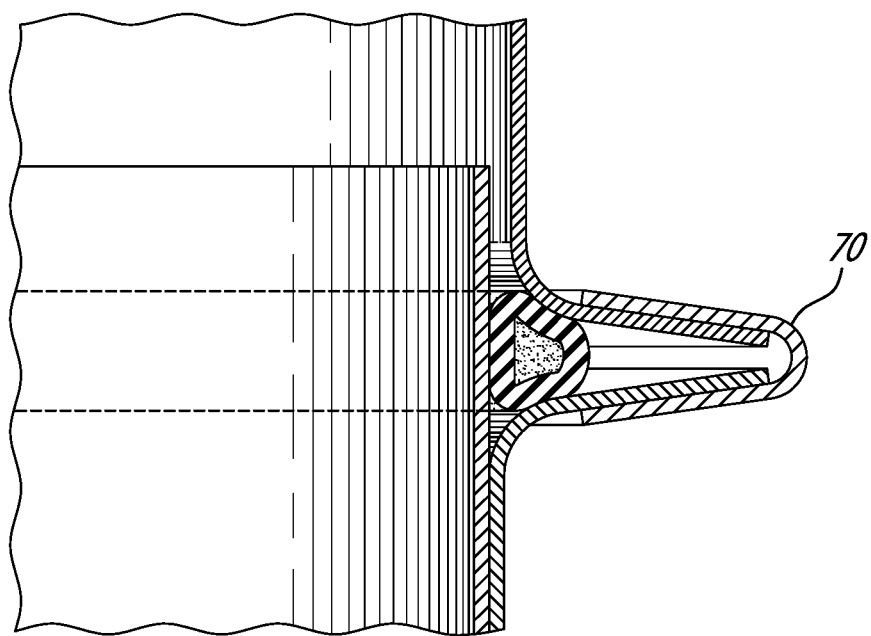
Figure 8B:
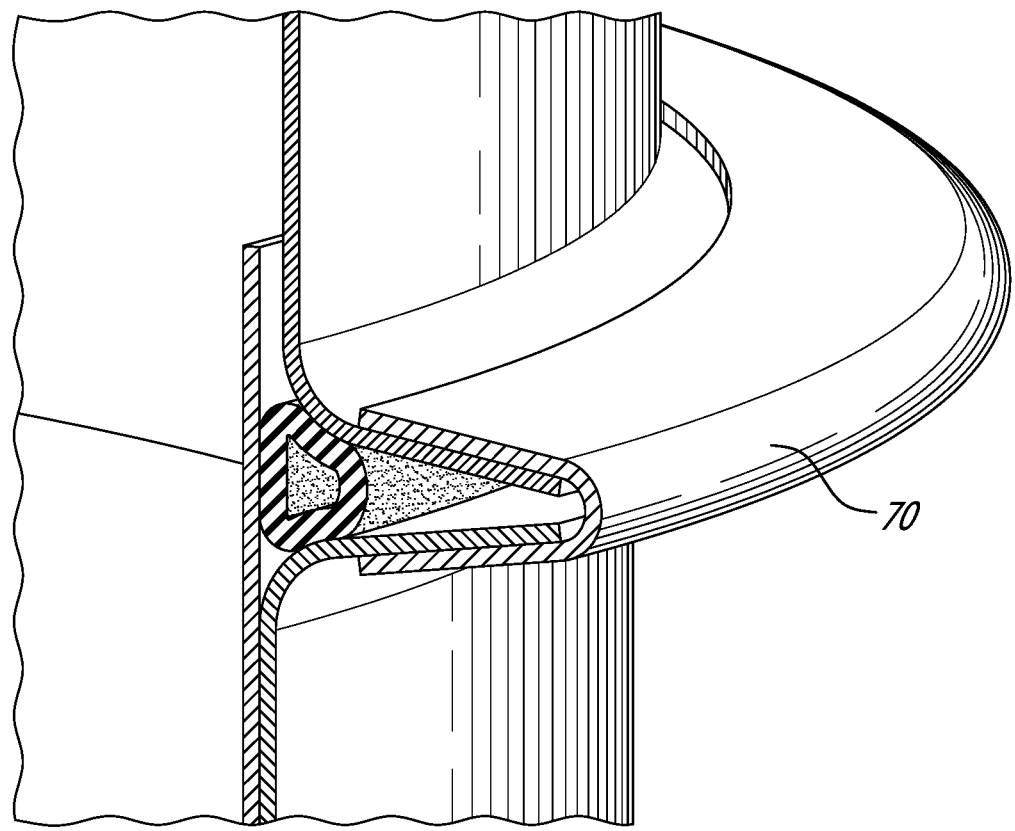
Figure 9:
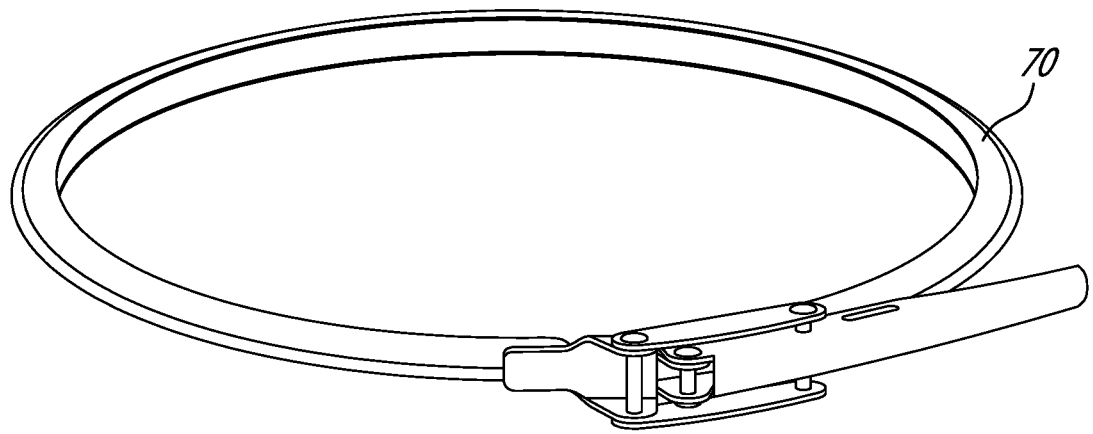
FIG. 9 shows a clamp ring according to an embodiment of an aspect of the present disclosure in a closed position thereof.
Figure 10:
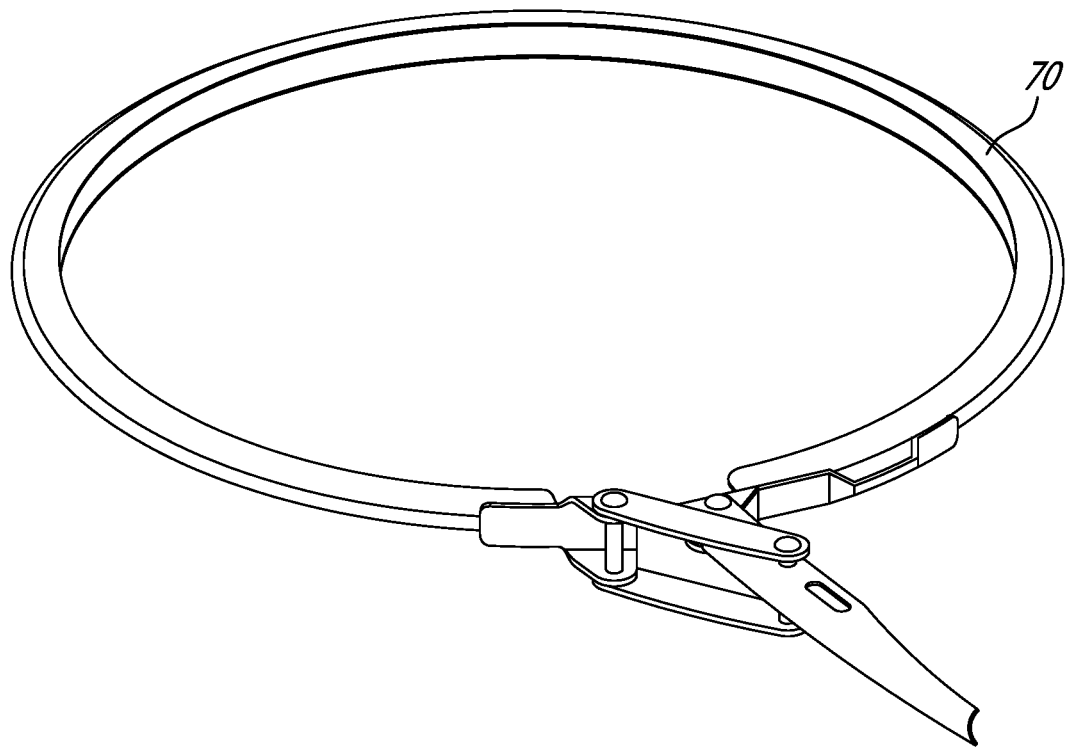
FIG. 10 shows the clamp ring of FIG. 9 in an open position thereof.

As schematically illustrated in FIG. 5, to close the steam chamber 12, first the handle 44 needs be aligned with the opening entrance 50 of the guide 42 (FIG. 5A), thereby allowing the handle 44 to slide along the slope 52 toward the locking end 53 (FIG. 5B). As the handle 44 is guide along the slope 52, it drives the bottom part 200 up towards the top part 100 (FIGS. 5C-D), thereby reducing the space between the bottom and top parts 100, 200 and tightening the gasket 300 therebetween (FIGS. 5G-H, FIGS. 6-8), in a locked position of the handle 44 (FIGS. 5E-5F).

The frame 41 secures the steam chamber assembly to the steam generator enclosure or housing (A).

Further locking the bottom and top parts 100, 200 of the steam chamber 12 together and ensuring sealing therebetween with the gasket 300 may use an optional ring clamp 70 shown for example in FIGS. 8-11 may be used.

There is thus provided a combination of liquid level sensors connected to a control unit and a hydraulic circuit configured in such a way that the water level and the water conditions are efficiently and safely monitored in a steam generator used as steam humidifier or other applications.

As people in the art will appreciate, the steam chamber is easily removed for opening and cleaning operation without requiring tools.

Moreover, the present system allows controlling the water level to prevent damage of immersed electric heating sources, or electrodes or heat exchanger, by using a continuous water level reading sensor, thereby reducing failure rate, while reducing numbers of components and providing an integrated hydraulic circuit, without direct contact between water and mechanical components.

The present steam generator may be used as a steam humidifier or for other applications using steam at atmospheric pressure.

The present steam generator allows the control and management of water level and water condition of steam generator whatever the purity of the water.

The present method and system, using an ultrasonic sensor, allow water level control with no direct contact to water and in absence of moving parts, yielding reliability and with no need of service during the life time of the steam generator. A very safe and reliable way to properly control water level for steam generator is thus provided.

The scope of the claims should not be limited by the embodiments set forth in the examples, but should be given the broadest interpretation consistent with the description as a whole.

The invention claimed is:

1. A steam generator, comprising:
   a water feed-and-drain hydraulic circuit comprising a fill valve in fluid communication with a water reservoir and a drain;
   a steam chamber, connected to the fill valve and to the drain, and comprising a heating source for heating the water to generate steam, steam being delivered out through a steam outlet, and waste water being evacuated through the drain;
   a control chamber, connected to the fill valve and to the drain; said control chamber and said steam chamber being fed with water through said fill valve at a same rate; said control chamber comprising at least one water level-sensor configured for continuously and proportionally detecting a water level in said steam chamber; and
   a control unit receiving signals of water levels in said steam chamber as detected by said water level-sensor; wherein the control unit controls the fill valve using the signals from said water level-sensor.

2. The steam generator of claim 1, wherein said control chamber is a tubular chamber, separate and generally deported from the steam chamber.

3. The steam generator of claim 1, wherein said water level-sensor comprises a proportional water level sensor.

4. The steam generator of claim 1, wherein said water level-sensor comprises a proportional water level sensor, said proportional water level sensor being an ultrasonic sensor.

5. The steam generator of claim 1, further comprising a foam sensor.

6. The steam generator of claim 1, further comprising a foam sensor positioned on a top surface of said steam chamber, wherein said foam sensor is one of: i) a conductive sensor and ii) a capacitive sensor, said foam sensor sending a signal to said control unit upon formation of foam.

7. The steam generator of claim 1, wherein said fill valve controls the waste water cooling off during draining.

8. The steam generator of claim 1, wherein the water feed-and-drain hydraulic circuit comprises an open-air gap connected to a water supply duct and to a drain duct.

9. The steam generator of claim 1, comprising a first water level sensor and a second water level sensor positioned at different positions relative to the control chamber, and further comprising a water temperature sensor, data collected from the first water level sensor and from the water temperature sensor yielding a first wave propagation speed, data collected from the second water level sensor and from the water temperature sensor yielding a second wave propagation speed, said control unit comparing said first and second wave propagation speeds to determine a mineral content of the water.

10. The steam generator of claim 1, wherein said steam chamber comprises an upper part and a removable bottom part, a guide-and-lock rotatably connecting said bottom part to said upper part.

11. The steam generator of claim 1, wherein said steam chamber comprises a bottom part and a top part, a guide connected to said upper part, and a handle connected to said bottom part, said guide engaging said handle for connecting said bottom part to said upper part and releasing said handle for disconnecting said bottom part from said upper part.

12. The steam generator of claim 1, wherein said steam chamber comprises a bottom part and a top part, a guide connected to said upper part, and a handle connected to said bottom part, said guide comprising an opening to a slanted slot ending in a locking end, and wherein: i) to connect said bottom part to said top part, said handle is aligned with said opening of the guide and made to slide along the slanted slot toward the locking end, thereby tightening said bottom part to said top part; and ii) to disconnect said bottom part from said upper part, said handle is disengaged from said locking end down said slanted slot and out of said opening, thereby releasing said bottom part from said upper part.

13. The steam generator of claim 1, wherein water is fed from the reservoir to the steam chamber and mixed with hot waste water drained from the steam chamber upstream.

* * * * *